Oct. 13, 1942.  E. M. DU VALL  2,298,552
SELF-HEADING BOLT
Filed June 26, 1941  2 Sheets-Sheet 1
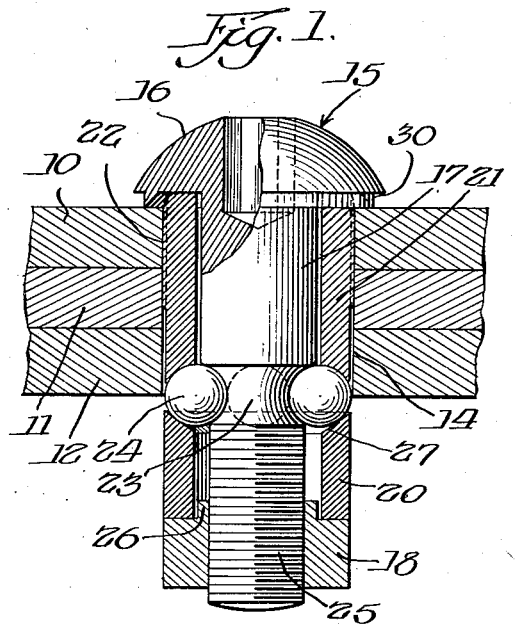
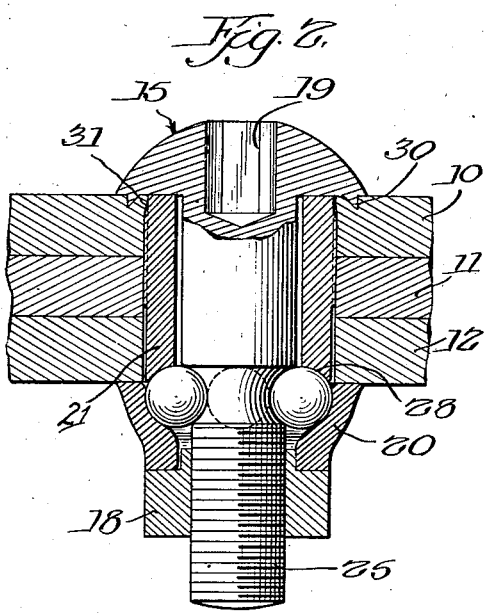
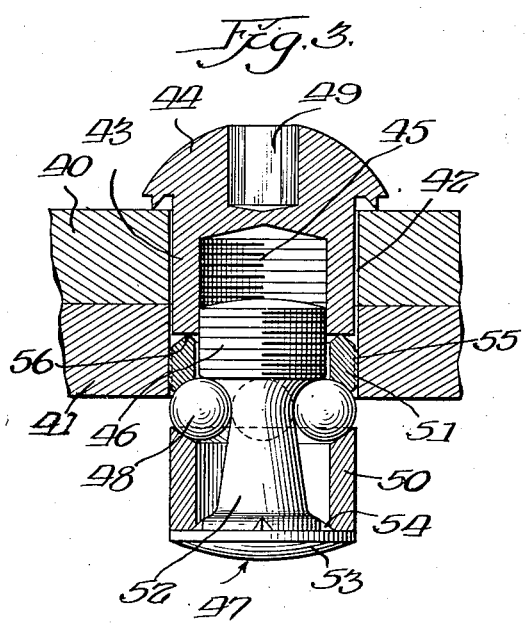
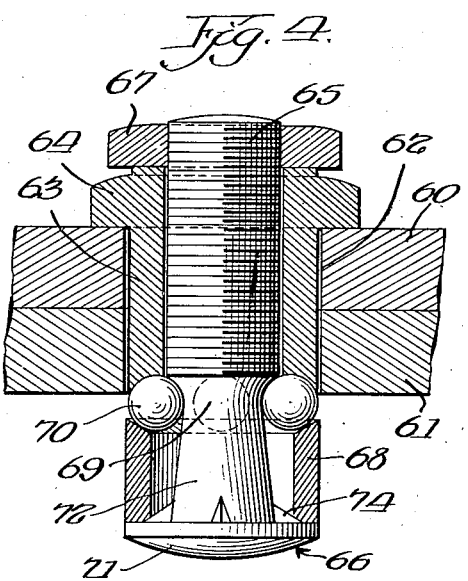
Inventor:
Emile M. DuVall Oct. 13, 1942.  E. M. DU VALL  2,298,552
SELF-HEADING BOLT
Filed June 26, 1941    2 Sheets-Sheet 2
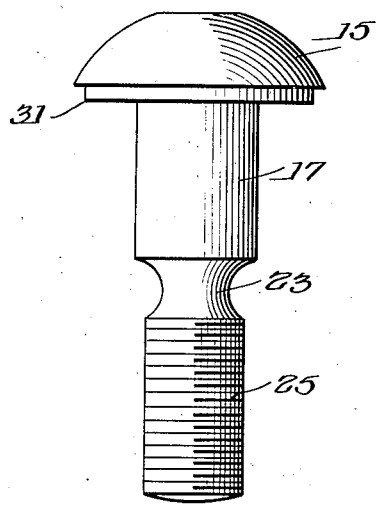
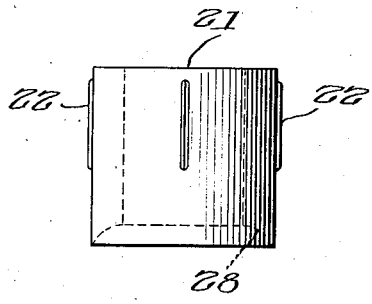
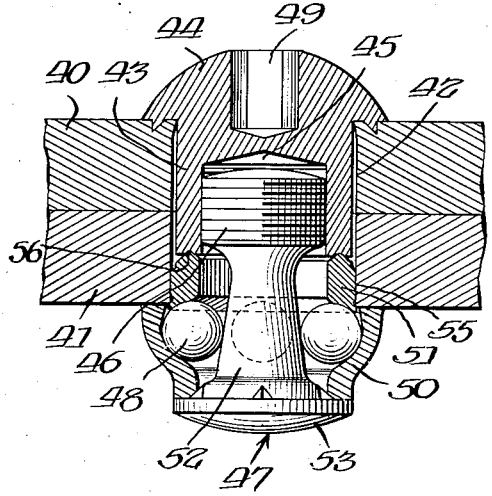
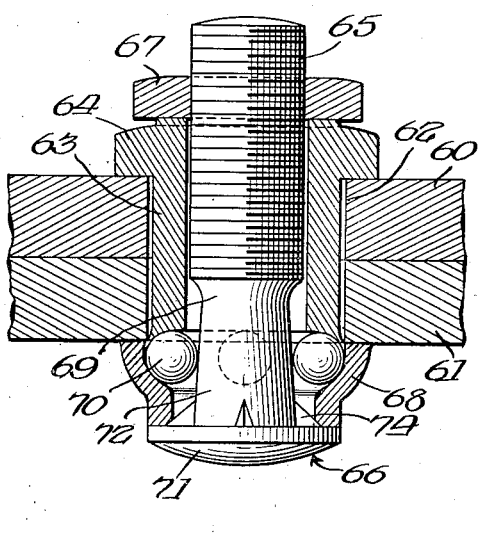
Inventor:
Emile M. Du Vall
By Wilkinson, Huxley, Byron & Knight
Attys.

Patented Oct. 13, 1942

2,298,552

UNITED STATES PATENT OFFICE 2,298,552

SELF-HEADING BOLT

Emile M. Du Vall, Chicago, Ill., assignor to Robert E. Owens, Chicago, Ill.

Application June 26, 1941, Serial No. 399,788

13 Claims. (Cl. 85—1)

The invention relates to bolts of the self-heading type and has more particular reference to an article of manufacture which will have utility as an emergency expansion bolt and which will also find use in difficult locations where all operations are required to be performed on one side of the work.

The invention has for an object the provision of an improved self-heading bolt, that can be mechanically expanded from the same side of the work from which the bolt was inserted, and which will be simple in construction but highly efficient for all practical installations.

Another object is to provide a bolt that may be mechanically expanded at one end by rotating the head at the opposite end, and wherein friction is materially reduced during the expanding operation by the provision of ball bearings at the points of maximum stress.

A further object is to provide an expansion bolt which will incorporate hardened steel balls for expanding the collar, and which will also reduce the friction between contacting surfaces to the greatest possible extent.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a vertical sectional view showing an expansion bolt embodying the constructional features of the present invention;

Figure 2 is a vertical sectional view similar to Figure 1 but showing the position the parts assume when the bolt is expanded;

Figure 3 is a vertical sectional view illustrating a modified form of expansion bolt also incorporating the hardened steel balls and other constructional features of the invention;

Figure 4 is another form of expansion bolt coming within the invention;

Figure 5 is an elevational view of the bolt proper in the device of Figure 1;

Figure 6 is an elevational view of the sleeve employed in the device of Figure 1;

Figure 7 is a vertical sectional view showing the bolt of Figure 3 in expanded form; and Figure 8 is a vertical sectional view similar to Figure 4 but showing the bolt thereof expanded.

In the drawings I have illustrated a preferred form of the invention which is shown in associated relation with overlapping metal plates 10, 11 and 12, each having a hole therein forming the aligned opening 14. The expansion bolt of the invention has an outside dimension so as to form a tight fit with opening 14 and which will prevent certain parts from rotating while permitting the bolt proper to rotate to produce expansion of the end of the bolt extending beyond plate 12. The bolt, designated in its entirety by numeral 15, includes the head 16 having formed integral therewith the cylindrical shank 17 on which is mounted the nut 18, expansion collar 20, and sleeve 21.

The head 16 of the bolt is recessed to form a socket 19 of any desired formation to receive a tool so that the bolt may be rotated. A portion of shank 17 is smooth surfaced and this portion receives the sleeve 21 which telescopes the same and has a length substantially equal to the thickness of the overlapping plates. The sleeve 21 may be described as loosely mounted on the smooth surfaced portion of the shank so as to permit relative rotation of these parts. However, the sleeve is formed with longitudinally extending ribs 22 on the outer circumference thereof adapted to engage the walls of opening 14 to hold the sleeve against rotation. This will be clearly understood by referring to Figures 1 and 2 wherein it will be seen that the longitudinal ribs 22 are in contact with the walls of opening 14. Actually the diameter of the opening should be somewhat less than the outside diameter of the ribs so that the ribs will bite into the metal to form an anchorage for the sleeve, preventing rotation thereof. A circumferential recess is formed on the shank of the bolt below the smooth surfaced portion thereof forming a ball race 23 for receiving the hardened steel balls 24. The remaining portion of the shank is threaded as at 25 and said threaded portion receives the nut 18. The expansion collar 20 is confined between the nut and the hardened steel balls 24.

A feature of the invention resides in forming an upstanding lip 26 on the nut 18 having a location with the expansion collar 20 and which assists in proper alignment of the expansion collar to maintain the cylindrical walls thereof in parallel relation with the shank of the bolt. When the collar is properly aligned pressure is distributed uniformly to the hardened steel balls 24 and if the pressure is continued to cause expansion of the collar said expansion will likewise take place uniformly to produce an expanded head on this end of the bolt such as shown in Figure 2. The upper end of collar 20 is bevelled inwardly at 27 to provide a cup-like retaining edge for the steel balls and said inwardly bevelled portion also facilitates outward movement of this end of the collar in the expansion of the same. The lower end of the sleeve 21 is also bevelled to accommodate the steel balls. However, with respect to this element the bevel indicated by numeral 28, Figure 2, is arcuate, having a radius approximately the same as that of the hardened steel balls in contact therewith.

The diameter of nut 18, collar 20 and sleeve 21 is slightly smaller than the opening 14 of the work piece. Therefore, it is possible to insert the bolt in the opening without any obstruction from the elements adapted to project on the other side of plate 12. A driving fit is desirable for the reason that sleeve 21 should be held in the opening so as to prevent rotation and this is assisted by the ribs 22 which engage the walls of the opening as described. In the operation of expanding the bolt of Figure 1 the head 16 is rotated by a tool located within socket 19 and which rotation will be in a direction to cause the nut 18 to travel along the threaded portion 25 in a direction toward the hardened steel balls 24. Movement of the nut 18 in this direction will compress the collar 20 to the extent where the collar will encompass the balls and further movement in this direction will eventually bring the collar into contact with the undersurface of plate 12. It will be understood that the collar 20 is formed of metal characterized by remarkable expansion properties. The collar will have the ability of expanding so as to encompass the hardened steel balls 24 without splitting. This action forms the head on this end of the bolt and by drawing the collar up as tightly as possible the expanded head will effectively lock the bolt in place and securely hold the metal plates in overlapping relation. A low carbon, nickel steel has been found to comprise satisfactory metal for the expansion collar 20. An alloy of this nature has suitable expansion properties and yet is sufficiently ductile and tough to form a satisfactory expanded head.

The head 16 has a friction ring 30 formed on the underside thereof which is in the form of a bevelled projection having a diameter somewhat larger than the diameter of opening 14. The friction ring will therefore engage the top surface of plate 10 around opening 14 and when the friction ring has been fully embedded in the plate a wedge-acting flange is formed indicated by numeral 31, which will have a wedging action with respect to sleeve 21. Said flange will be forced into contact with the sleeve to help prevent rotation of the sleeve and the flange will also seal off the opening at this end of the bolt to form a water-tight connection. The friction ring has additional utility in that it materially reduces friction between head 16 of the bolt and plate 10 such as would hinder rotation of the bolt. It will be seen by reference to Figure 1 that upon initial rotation of head 16 the same has only a ring contact with plate 10. If the friction ring were eliminated the entire undersurface of the head would be in contact with the plate and this large surface area means an increase in frictional contact.

The bolt shown in Figure 3 is adapted to be inserted in aligned openings formed in the overlapping metal plate 40 and 41. The said aligned openings, indicated by numeral 42, receive the sleeve 43 formed integral with the head 44 of the bolt. The head is formed with a socket opening 49 and in accordance with this modification the sleeve is recessed and threaded as at 45 for threaded engagement with the threaded portion 46 of the nut indicated in its entirety by 47. Said nut immediately below the threaded portion 46 is formed to provide a ball race for the hardened steel balls 48 which are confined between the expansion collar 50 and a friction sleeve 51. The shank 52 of nut 47 terminates in a head 53 having projections or upstanding knife edges 54 for engagement with collar 50 to prevent rotation thereof with respect to the nut. The friction sleeve 51 is provided with longitudinally extending ribs 55 which bite into the walls of opening 42 and as a result the said sleeve is held against rotation. However, sleeve 43, and also the head 44 integral therewith, is adapted to be rotated in the act of expanding the collar 50 and therefore to reduce friction between the parts sleeve 51 is bevelled to produce the pointed upper end 56. This pointed upper end reduces to a minimum the surface contact between sleeve 55 and sleeve 43 and the friction which would tend to hinder rotation of head 44 is reduced to a similar extent.

In the operation of expanding the modified form of bolt shown in Figure 3 the head 44 is rotated by means of a tool inserted in socket 49. The rotation of sleeve 43 which results therefrom will operate to telescope the threaded portion 46 within the sleeve and as the nut and head are drawn together the collar 50 is subjected to pressure. Continued rotation of head 44 will act on collar 50 to the extent of expanding the collar so as to encompass the hardened steel balls 48 and eventually bring the collar solidly up against the undersurface of plate 41, as shown in Figure 7. For the proper operation of this form of bolt it is necessary to prevent rotation of nut 47 and for this reason the friction sleeve 51 is employed, having ribs 55 for holding the same against rotation in opening 42. As a result, the collar 50 does not have any tendency to rotate and said collar and nut 47 are interlocked by reason of the projections or upstanding knife edges 54.

The form of expansion bolt shown in Figure 4 is somewhat similar to the bolt shown in Figure 3. In this modification the overlapping metal plates 60 and 61 have an aligned opening 62 extending therethrough for receiving the sleeve 63 which is integral with head 64. However, the interior of the sleeve and the head is smooth surfaced and the threaded portion 65 of the bolt 66 extends therethrough and receives the nut 67 which is rotated while the other parts remain stationary to cause expansion of the collar 68. A ball race 69 is formed on the bolt immediately below the threaded portion and said race accommodates the hardened steel balls 70 which are confined between the arcuate lower surface of sleeve 63 and the inwardly bevelled upper surface of collar 68. Bolt 66 has a head 71 provided with projections in the form of upstanding knife edges 74 which engage with collar 68 so as to prevent rotation of the collar relative to the bolt.

The outside diameter of sleeve 63, collar 68 and head 71 is less than that of opening 62 and therefore it is possible to insert the end of the bolt to be expanded through said opening. Sleeve 63 is held against rotation by applying a tool such as a wrench to the head 64 which may have a hexagonal shape or other conventional shape well known in the art. Another wrench is then applied to nut 67 and the nut is rotated in a direction to draw the bolt 66 upwardly so as to compress the collar 68, as shown in Figure 8. Pressure applied to the collar, which is formed of metal characterized by remarkable expansion properties, will eventually expand the upper end of the same over the hardened steel balls 70 to bring the collar into solid engagement with the undersurface of plate 61.

It will be observed that shank 52 of the nut 47, shown in Figure 3, and shank 72 of the bolt, shown in Figure 4, are both formed with a slight taper which increases in diameter in a direction downwardly toward the head of their respective element. The purpose of this tapering formation on the shank is to produce a gradual movement of the hardened steel balls in an outward direction during operation of expanding the collars 50 and 68, respectively. In other words, during operation of drawing up the nut or bolt for expansion purposes the collar is forced to ride over the balls so as to encompass them and simultaneously with this action the hardened steel balls are given a slight outward movement to further increase the expansion of said collar.

What is claimed is:

1. An expansion bolt for insertion in an opening extending through parts to be joined thereby, including a sleeve adapted to have location within said opening, a longitudinally extending member within the sleeve and concentric therewith, said longitudinally extending member projecting beyond the sleeve on one side of the said parts to be joined, an expansion collar supported by said projecting portion of the longitudinally extending member, and a plurality of relatively hard surfaced balls confined between said sleeve and expansion collar, said balls having association with said collar in a manner whereby movement of the collar in an axial direction toward the sleeve will force the collar to encompass the balls, thereby expanding the collar.

2. An expansion bolt for insertion in an opening extending through parts to be joined thereby, including a sleeve having an outside diameter to fit within the said opening, a longitudinally extending member having location within the sleeve and concentric therewith, said longitudinally extending member projecting beyond the sleeve on at least one side of the said parts to be joined, an expansion collar having an outside diameter to pass through said opening and being supported by said projecting portion of the longitudinally extending member, a plurality of relatively hard surfaced balls confined between the sleeve and expansion collar, said longitudinally extending member providing a circumferential ball race for receiving and positioning said balls, and said balls having association with said collar in a manner whereby movement of the collar in an axial direction toward the sleeve will force the collar to encompass the balls, thereby expanding the collar.

3. An expansion bolt for insertion in an opening extending through parts to be joined thereby, including a sleeve having an outside diameter to fit within the said opening, a longitudinally extending member having location within the sleeve and concentric therewith, said longitudinally extending member projecting beyond the sleeve on at least one side of the said parts to be joined, an expansion collar having an outside diameter to pass through said opening and being supported by said projecting portion of the longitudinally extending member, a plurality of relatively hard surfaced balls confined between the sleeve and expansion collar, said longitudinally extending member providing a circumferential ball race for receiving and positioning said balls with respect to the collar and sleeve so that the outside diameter formed thereby will not exceed that of said opening, and said balls having association with said collar in a manner whereby movement of the collar in an axial direction toward the sleeve will force the collar to encompass the balls, thereby expanding the collar.

4. An expansion bolt for insertion in an opening extending through parts to be joined thereby, including a sleeve adapted to have location within the said opening, a longitudinally extending member having location within the sleeve concentric therewith, said longitudinally extending member projecting beyond the sleeve on at least one side of the said parts to be joined, an expansion collar having an outside diameter so as to pass through said opening and having location on the projecting portion of said member in concentric relation therewith, means on the projecting end of the member having contact with said collar to retain the same on the member, means for expanding the collar including a plurality of relatively hard surfaced balls confined between said sleeve and said collar, said longitudinally extending member having a circumferential groove therein providing a ball race for receiving and retaining said balls, and said balls having association with said collar in a manner whereby movement of the collar in an axial direction toward the sleeve will force the collar to encompass the balls, thereby expanding the collar.

5. An expansion bolt for insertion in an opening through parts to be joined thereby, including a sleeve having an outside diameter to fit within said opening, a longitudinally extending member in telescoping relation with said sleeve and projecting beyond the sleeve and beyond the parts to be joined on one side thereof, an expansion collar on the projecting portion of the longitudinally extending member, means on said projecting end of said member having contact with the collar to retain the same on the member, means for expanding said collar including a plurality of relatively hard surfaced balls confined between said sleeve and said collar, and said longitudinally extending member having a circumferential groove therein substantially located in a plane beyond one surface of the parts to be joined providing a circumferential ball race for receiving and positioning the balls, whereby movement of the collar in an axial direction on the member toward the sleeve will force the collar to encompass the balls and will also bring said collar solidly up against the undersurface of the parts to be joined.

6. An expansion bolt including a head having a shank integral therewith and threaded to receive a nut at the end opposite the head, a sleeve in telescoping relation with the shank and positioned adjacent the head, an expansion collar supported on said shank by said nut and having contact therewith, a plurality of hard surfaced balls confined between the sleeve and expansion collar, and said shank having a circumferential groove therein providing a circumferential ball race for receiving and positioning said balls, said ball race having a depth sufficient to retain the balls so that they do not substantially project beyond the external diameters of the collar and sleeve.

7. An expansion bolt including a head having a shank integral therewith and threaded to receive a nut at the end opposite the head, a sleeve in telescoping relation with the shank and positioned adjacent the head, an expansion collar having an outside diameter approximately the same as that of the sleeve and supported in concentric relation on said shank, said nut having contact with the collar to retain the same on the shank, hardened steel balls confined between the sleeve and said expansion collar, said shank having a circumferential groove therein providing a circumferential ball race for receiving and positioning said balls, the maximum outside diameter formed by said balls when in position on the ball race substantially approximating that of the collar, and the end of the collar in contact with the balls having a bevelled surface sloping inwardly to provide a seat tending to retain the balls against the shank whereby said collar is expanded by moving the same axially on the shank toward the sleeve so as to encompass said balls.

8. An expansion bolt for insertion in an opening through parts to be joined thereby, including a sleeve having an outside diameter to fit tightly within said opening whereby the sleeve is prevented from rotating, a longitudinal member extending through said sleeve, said member having a head at one end of larger diameter than the opening and having its other end threaded to receive a nut, an expansion collar in concentric relation on the threaded end of the member and supported by said nut which retains the same thereon, means for expanding the collar including a plurality of relatively hard surfaced balls confined between the sleeve and said expansion collar, said balls with the collar expanded having location within the collar, and said member providing a circumferential ball race for receiving and positioning said balls.

9. An expansion bolt for insertion in an opening through parts to be joined thereby, including a sleeve having an outside diameter to fit tightly within said opening whereby the sleeve is prevented from rotating, a longitudinal member extending through said sleeve, said member having a head at one end of larger diameter than the opening and having its other end threaded to receive a nut, an expansion collar in concentric relation on the threaded end of the member and supported by said nut which retains the same thereon, means for expanding the collar including a plurality of relatively hard surfaced balls confined between the sleeve and said expansion collar, said balls with the collar expanded having location within the collar, and said member having a circumferential groove therein providing a circumferential balls race for receiving and substantially positioning the balls in a plane approximately parallel to but spaced outwardly from the undersurface of the parts to be joined.

10. An expansion bolt for insertion in an opening through parts to be joined thereby, including a sleeve having an outside diameter to form a tight fit within said opening and having a length approximately equal to the thickness of said parts, a longitudinal member extending through said sleeve to project beyond both ends thereof, said member having a head at one end of larger diameter than the opening and having its other end threaded to receive a nut, an expansion collar in concentric relation with the threaded end of said member and supported by said nut so as to retain the same thereon, and a plurality of hard surfaced balls located between said sleeve and said expansion collar, the maximum outside diameter formed by said balls substantially equalling that of the expansion collar and which is smaller than said opening so that the elements will pass therethrough, and said longitudinal member having a circumferential groove therein providing a ball race for receiving and positioning the major portion of the balls in a plane beyond the undersurface of the parts to be joined, whereby movement of the collar in an axial direction on the member toward the sleeve will force the collar to encompass the balls, thereby expanding the collar.

11. An expansion bolt including a head having an internally threaded sleeve integral therewith, a nut having a portion in threaded engagement with said sleeve and including a longitudinally extending shank terminating in a head, an expansion collar on said shank in concentric relation therewith and having contact with said terminal head to retain the collar on said shank, a plurality of relatively hard surfaced balls located between the sleeve and said collar, a circumferential ball race provided by the shank of said nut for receiving and positioning said balls, said ball race having a depth so that the balls do not substantially project outwardly beyond the external diameters of the sleeve and collar, and the end of the collar in contact with the balls having a bevelled surface sloping inwardly to provide a seat tending to retain the balls against the shank whereby relative rotation between the sleeve and said nut in a certain direction will produce axial movement of the nut to force the expansion collar to encompass the balls, thereby expanding the collar.

12. An expansion bolt for insertion in an opening through parts to be joined thereby, including a sleeve fitting within said opening and having a head formed integral therewith, a longitudinal member having concentric relation with said sleeve and projecting beyond at least one end of said sleeve, said projecting portion of the member including a shank terminating in a head having a smaller diameter than said opening in the parts to be joined, an expansion collar on the shank having contact with said terminal head to retain the collar on said shank, means for expanding said collar including a plurality of hard surfaced balls located between the sleeve and said collar, said balls having association with the collar in a manner whereby movement of the collar in an axial direction toward the sleeve will force the collar to encompass the balls thereby expanding the collar, and a circumferential ball race provided by the shank of said longitudinal member for receiving and positioning said balls, said shank tapering outwardly in a direction from the ball race toward the said terminal head.

13. An expansion bolt for insertion in an opening extending through parts to be joined thereby, including a sleeve adapted to have location within said opening, a longitudinally extending member having location within the sleeve, said longitudinally extending member projecting beyond the sleeve on at least one side of the said parts to be joined, an expansion collar having an outside diameter to pass through said opening and having location on the projecting portion of said member in substantial concentric relation therewith, means on the projecting end of the member having contact with said collar to retain the same on the member, means for expanding the collar including a plurality of balls confined between the sleeve and the collar, said longitudinally extending member having a circumferential groove therein providing a ball race for receiving and positioning said balls so that they do not substantially project beyond the external diameters of the collar and sleeve, and the adjacent ends of the collar and sleeve being bevelled to form an inwardly directed seat for the balls, whereby axial movement of the collar toward the sleeve will cause the collar to encompass the balls effecting lateral expansion of the end of the collar adjacent the above mentioned side of the parts to be joined.

EMILE M. DU VALL.